May 26, 1964　　　H. H. KOBRYNER　　　3,134,931
POLYPHASE METER MOUNT
Filed July 12, 1960　　　　　　　　　　　3 Sheets-Sheet 1

INVENTOR.
HERMAN H. KOBRYNER
BY
Roy C. Hopgood
ATTORNEY

May 26, 1964

H. H. KOBRYNER 3,134,931

POLYPHASE METER MOUNT

Filed July 12, 1960

INVENTOR.
HERMAN H. KOBRYNER
BY Roy C. Hopgood
ATTORNEY

2

United States Patent Office 3,134,931
Patented May 26, 1964

3,134,931
POLYPHASE METER MOUNT
Herman H. Kobryner, Forest Hills, N.Y., assignor to Murray Manufacturing Corporation, Brooklyn, N.Y.
Filed July 12, 1960, Ser. No. 42,339
1 Claim. (Cl. 317—104)

This invention relates to a polyphase meter mount for a socket-type meter and, more particularly, it relates to a generally standardized meter mount for polyphase installations.

Still more specifically, this invention relates to a unique heat dissipating arrangement in a meter mount, whereby meter mounts of current capacity ranging, for example, between 100 and 200 amperes may be made from the same standardized components.

The conventional meter is equipped with contact blades that engage contact clips provided in the meter mount, the clips being connected to the line and load conductors, respectively. The electrical circuit between the line and load conductors is completed by plugging the meter into the meter mount.

In some instances, meter by-pass arrangements, such as disclosed in Patent No. 2,838,627, assigned to the Murray Manufacturing Corporation, are included in the mount to permit the removal of the meter without interrupting the electrical service. These installations have been generally of the single phase type.

In recent years there has been an increasing demand for polyphase installations. The polyphase meter mount obviously requires a larger number of fittings, bus bars and other current conducting parts which results in an increased dissipation of heat. Ordinarily, a three-phase installation dissipates 50% more heat than a single-phase installation of similar rating.

This increased dissipation of heat presents no problem if the mount enclosure is enlarged and the current carrying parts made heavier to reduce losses. There is a trend in the industry, however, towards standardization of meter mounts, fittings and connectors, so that the simpler solution of increasing the current conducting parts is unacceptable.

Accordingly, it is a first object of this invention to provide a polyphase meter mounting arrangement which greatly improves the efficiency of heat dissipation and permits standardization of meter mounts for single and polyphase installations.

It is a further object of the invention to provide a polyphase mounting installation comprising an arrangement of electrical fittings in conjunction with a base assembly to improve the efficiency of heat dissipation by means of radiation, convection and conduction.

In accordance with an aspect of the invention, there is provided a meter mount comprising a thermal transferring and electrically insulating base assembly to which electrical fittings for a polyphase assembly are mounted. The base is secured in thermal transferring relationship to a metallic bridge assembly which is affixed to the meter enclosure. Electrical contact clips and contact elements for a meter by-pass arrangement, are mounted to transfer the heat generated at the electrical connections, through the assembly of the base and bridge to the enclosure.

The above mentioned and other features and objects of this invention and the manner of attaining them will become more apparent and the invention itself will be best understood by reference to the following description of an embodiment of the invention taken in conjunction with the accompanying drawing, wherein.

Figure 1:
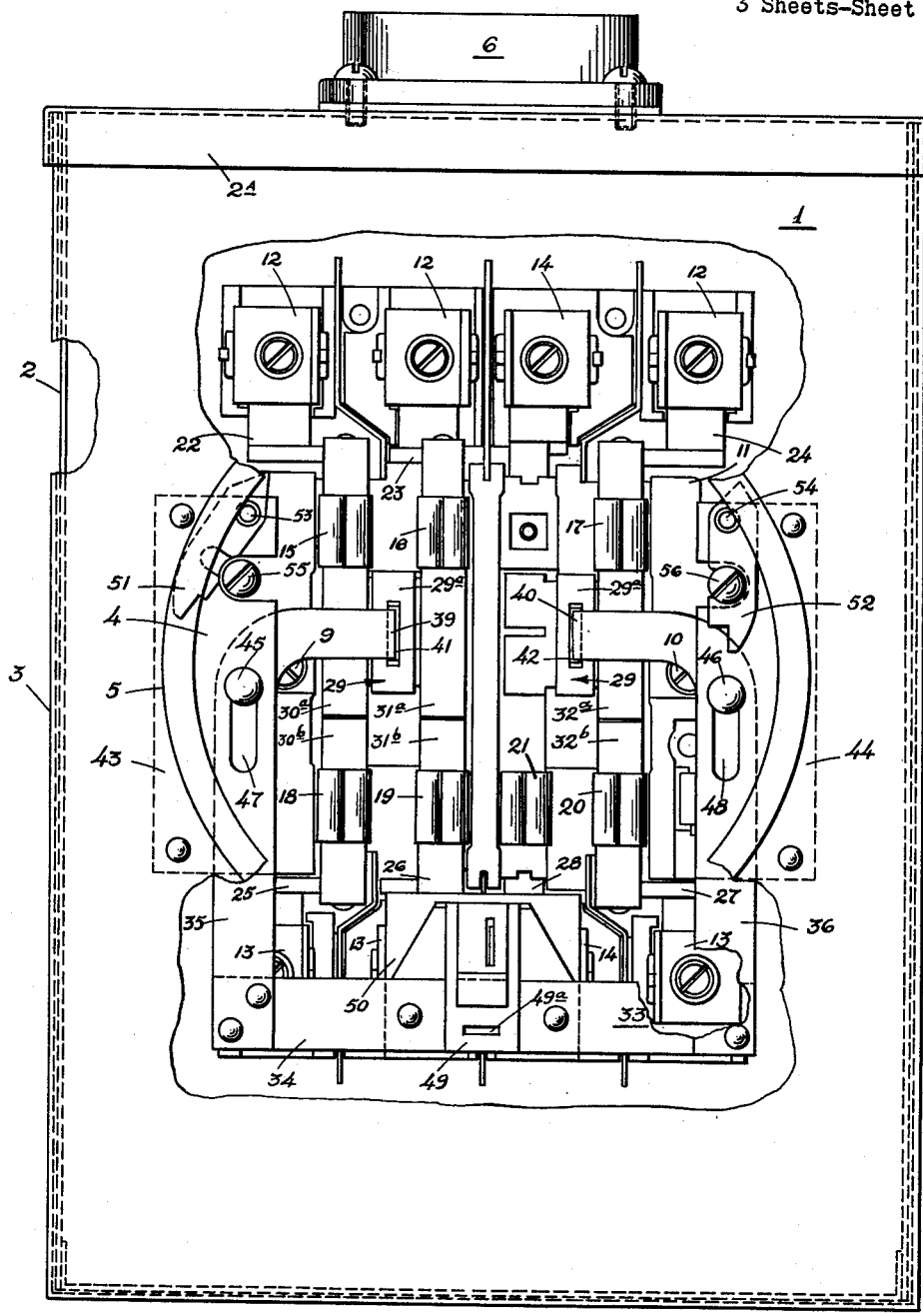
FIGURE 1 is a front view of the meter enclosure with a portion of the cover cut-away to show the meter mount and by-pass arrangement.

Referring first to FIGURE 1, a standardized enclosure or meter mount housing 1 comprises a box-shaped portion 2, top endwall and cover 3 which is provided with a centrally located opening 4 for a meter (not shown). The opening is provided with a formed-up flange 5 around the perimeter of the opening 4. The meter, during normal operation, is sealed to the meter mount box by a band which encloses the flange 5 and a complementary peripheral edge on the meter.

A collar or hub 6 is provided for connecting a conduit or cable armor to the enclosure. In the illustration, the collar is shown at the top of the enclosure. The enclosure is a housing for the meter mount structure, generally illustrated in the cut-away portion of the figure; the meter mount being secured to the enclosure by screws 9 and 10.

The meter mount comprises an electrically insulating and thermally transferring base or block 11 (better seen in FIGS. 2, 3), which is preferably made of porcelain, but may be made of other suitable insulating material. Line connectors 12 are located at one end of the base 11 for connection to line conductors (not shown) which enter the enclosure through the collar 6. Load connectors 13 (partially obscured) are located at the opposite end of the mount; and, connectors 14 are provided for a neutral line.

The service mains are coupled to the load conductors through the meter which engages clips 15, 16, 17 (on the line side) and clips 18, 19 and 20 (on the load side). The clips 15, 16 and 17 are mounted on the base 11 and connected through fittings 22, 23 and 24, respectively, to the line connectors 12. The clips 18, 19 and 20 are similarly connected through fittings 25, 26 and 27, respectively, to the load connectors 13; and, the neutral clip 21 is connected to the neutral connector 14 through the fitting 28. The specific details of the fittings and the manner in which they couple the connectors to the clips will be described in detail later.

In a preferred embodiment of the invention, a by-pass arrangement is provided for shorting the line connectors to the load connectors, thereby permitting the removal of the meter without interruption to the service.

Figure 3:
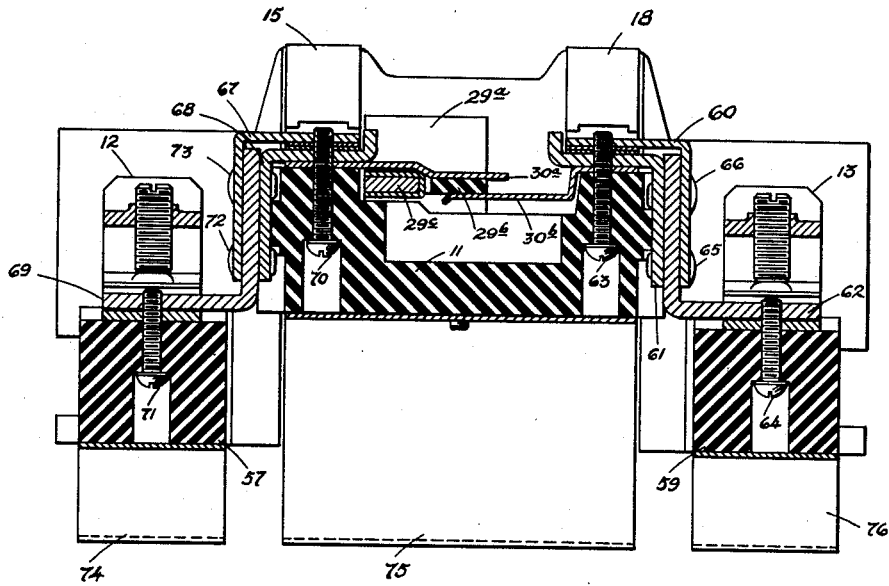
FIGURE 3 is a side view, in section, of a polyphase meter mount having a capacity of 200 amperes; and, FIGURE 4 is a view of the underside of a cover for a meter mount enclosure equipped with a by-pass arrangement.
Figure 2:
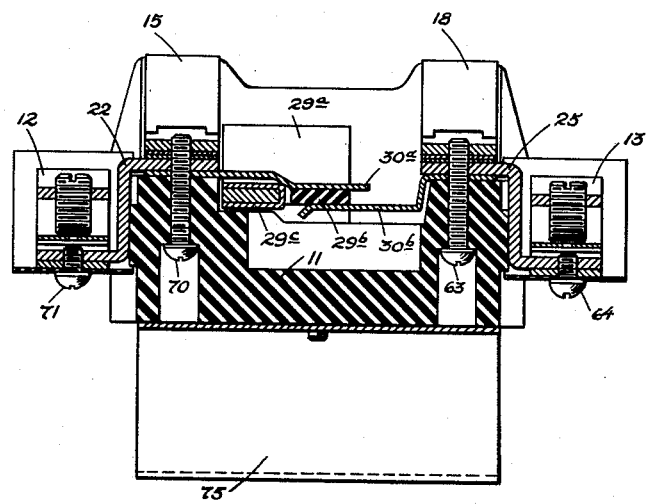
FIGURE 2 is a side view, in section, of a polyphase meter mount having a capacity of 100 to 150 amperes.

Referring now to FIGS. 1, 2 and 3, the by-pass arrangement comprises a pair of insulated contact carriers 29. Each carrier is preferably a molded plastic member comprising an upright portion 29a and oppositely disposed side arms, one of which is shown at 29b. Each side arm is molded with a laterally extending slot for accommodating the base of a U shaped clip member 29c which extends over half the side arm.

The by-pass arrangement also comprises pairs of shunting bars 30a and 30b, 31a and 31b, 32a and 32b; each pair of bars being connected selectively to short a line conductor to its corresponding load conductor. The bars 30a, 31a and 32a are connected at one end to the contact clips 15, 16 and 17, respectively, while the bars 30b, 31b and 32b are connected at one end to the contact clips 18, 19 and 20, respectively. The opposite ends of each pair of bars extend towards each other, so as partially to overlap. The overlapping portions of the bars are spaced so as to accommodate the insulating portion of the carrier side arm when the carrier is in a raised position. When the carriers 29 are moved downwardly, the conducting clip 29c on each carrier side arm contacts the overlapping portions of a pair of bars. The clip, extending over the insulating part, ensures a good electrical connection between the bars.

Figure 4:
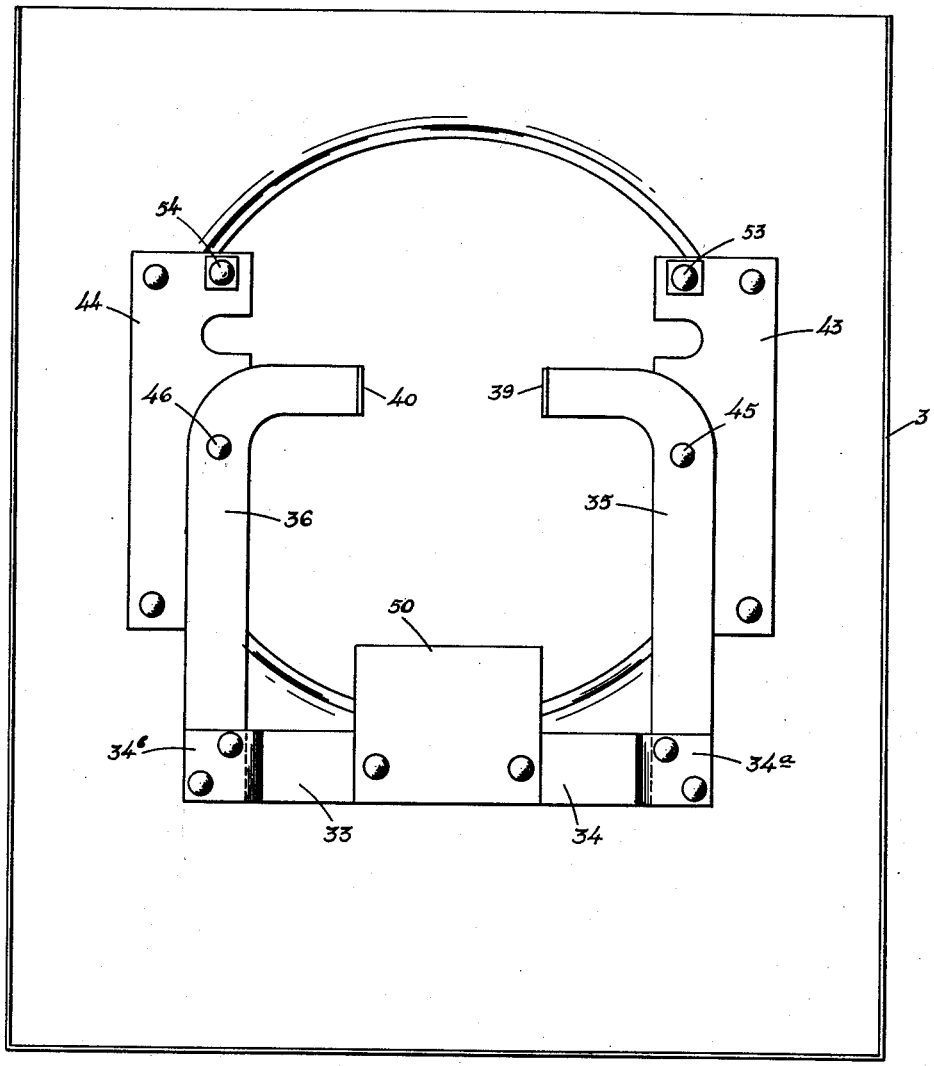

The carriers 29 are moved vertically in sliding manner by a driving mechanism 33, which is more clearly shown in FIG. 4. The driving mechanism is supported by mounting plates 43 and 44, which are attached, e.g., by rivets to the closure cover 3. The driving mechanism is in the shape of a spoke assembly comprising a cross arm 34 having raised end portions 34a, 34b. Carrier engaging arms 35, 36 are fixed respectively at one end to the raised end portions of the cross arm 34. The opposite end of each arm 35, 36 is angle-shaped and extends towards the corresponding portion of the other arm. The end of each arm is bent to form a depending lug 39, 40, respectively, which fits into slots 41 and 42 (FIG. 1) in the upright portions 29a of the carriers 29, whereby the carriers may be driven by movement of the driving mechanism.

A manually operable member 49 and an insulating card 50 are attached, for example, by rivets to the cross arm of the driving mechanism. The member 49 is provided with a slot 49a to accommodate a screw driver so that the tool may be used to facilitate movement of the driving mechanism. The insulating card is positioned to provide the necessary spacing between the connectors 13, 14 and the member 49.

The yoke assembly is guided in its movement by guide pins 45, 46 affixed to the arms 35, 36 respectively; the pins being slidable in slots 47, 48 provided in the mounts 43, 44. The pins 45, 46 are provided with enlarged heads which ride on the periphery of the slots 47, 48, thereby also limiting the transverse (back-to-front) travel of the carrier arms. The vertical movement of the driving mechanism and, thus the carriers, is limited to the length of slots 47 and 48. The length of these slots, of course, is sufficient to permit the conductive clip 29c on each carrier side arm to short each pair of shunting bars of the by-pass arrangement.

The structures 43 and 44 are also provided with latches 51, 52 for locking the cover to the meter mount assembly. The latches are pivoted at 53 and 54 to the mounting plates 43 and 44, respectively. The latches are formed with recesses to engage shank portions of screws 55 and 56 mounted in the enclosure assembly. The latch 52 is shown engaging the screw 56. In this position, the screw may be tightened to lock the latch and cover to the meter mount. In the illustration, the latch 51 is shown in an open position, i.e. pivoted away from the screw 55. When the latches are in this position the cover 3 can be readily removed from the enclosure.

As previously mentioned, the problem of dissipating the heat generated at the electrical joints is more difficult in polyphase installations than in single phase installations. The problem, of course, becomes even more acute in installations having a higher current carrying capacity.

If standardized fittings are used in the different current carrying installations, the fittings carrying the higher current must dissipate the greater heat. Since the amount of heat generated can not be decreased without increasing the size of the fittings (which is contrary to the objects of this invention), there is provided a unique arrangement for transferring the heat away from the enclosure in a most effective manner.

More specifically, optimum heat transfer is accomplished first by providing a base having high heat transfer qualities. The base assembly is formed of a porcelain block, that is provided with large, flat contact surfaces. The fittings are mounted in direct contact with these surfaces to provide maximum heat transfer. Secondly, a supporting bridge for the block is provided which allows continuous air circulation to remove the heat transferred from the block to the bridge. By means of the novel assembly, the heat generated at the electrical connections is dissipated by conduction, convection and radiation without requiring a modification in the standard construction of the mount and without requiring an increase in the size of the enclosure.

The application of these concepts will be more readily apparent from an examination of the meter mount of FIG. 2, wherein the porcelain block, having large, flat contact surfaces is shown at 11. The contact clip 15, with its associated shunting bar 30a, and the contact clip 18, with its associated shunting bar 30b, are mounted to the block by screws 70 and 63, respectively. The connector 12 is connected to the clip 15 by a Z-shaped fitting 22; one arm of which is mounted to the block by the screw 70. This arm is mounted under the contact clip rather than within the legs of the clip (as is conventional in the prior art devices), and therefore a wider fitting having greater contact area is utilized. The other arm of fitting 22 is mounted in electrical and thermal contact with connector 12 by screw 71, and the center portion of the fitting is in thermal transferring contact with the upper side of the block 11.

In like manner, a Z-shaped fitting 25 connects connector 13 to the clip 18. One arm of the fitting is mounted under the clip, while the other arm is secured to the connector 13 by screw 64. The central portion of this fitting is in thermal transferring contact with the lower side of block 11.

Maximum contact is thus provided between the conducting elements and the porcelain block 11, permitting the heat to be conducted from the metal parts to the porcelain block and then radiated into the interior of the enclosure. To provide for maximum air circulation within the enclosure, a large steel bridge 75 is mounted in complete contact with the interior face of the block 11 to conduct the heat from the porcelain surfaces. The bridge, in turn, is mounted to the interior back wall of the enclosure 1. A heat transferring path is therefore provided from the porcelain block, through the bridge to the enclosure wall.

Furthermore, the bridge is U-shaped and the opening vertically aligned to eliminate air pockets, permitting a free vertical passage of air around the block. In this manner, a "chimney" effect takes place. The air strikes the metal parts and porcelain block and is warmed. It rises, striking the cooler enclosure walls, and gives off heat. The air then descends and the process is repeated, permitting the continuous circulation of air and transfer of heat.

In higher current carrying installations, having a greater amount of heat to be dissipated, a base assembly with even greater heat transfer capabilities must be provided. In the installation of FIG. 3, the fittings and connector supports have been modified to accomplish this. The base assembly comprises the main block 11, as well as upper and lower blocks 57 and 59 which support the connectors 12 and 13, respectively.

A fitting corresponding to the fitting 25 is formed of L-shaped member 60, 61 and 62. The members 60 and 61 sandwich the base of the clip 18, and the surface of the member 61 is at least coextensive with the underlying shunting bar 30b to provide maximum heat transfer. The clip, fitting and shunting bar assembly are secured to the block 11 by means of a single screw 63.

The other end of the fitting is positioned in the base of the connector 13, and is attached to the lower portion 59 of the block by a screw 64. The other arms of the members 60, 61 and 62 are rigidly fixed together by rivets 65 and 66; the assembled members 61 and 62 having a combined shape similar to the fitting 25 of FIG. 3.

Similarly, a fitting corresponding to the fitting 22 comprises the members 67, 68 and 69, one arm of each being joined together by the rivets 72 and 73. A screw 70 secures the other arms of members 67 and 68, the shunting bar 30a and the clip 15 on the block 11. Screw 71 affixes the other arm of member 69 and connector 12 to the block portion 57.

The addition of the members 60 and 67 to the fittings increases the volume of the current carrying parts, thereby reducing the heat generated by the fitting. In addition, auxiliary U-shaped, vertically aligned steel bridge supports 74 and 76, which are similar to the main bridge 75, are affixed to the block portions 57 and 59, respectively, to maintain these block portions in spaced relationship to the wall of the enclosure. In this manner, the auxiliary bridges aid in permitting the continuous circulation of air within the enclosure, in addition to aiding in the transfer of heat from the block portions to the wall of the enclosure.

While the foregoing description sets forth the principles of the invention in connection with specific apparatus, it is to be understood that this description is made only by way of example and not as a limitation of the scope of the invention as set forth in the objects thereof and in the accompanying claim.

What is claimed is:

A compact polyphase meter mount adapted to receive a meter having a plurality of pairs of contact blades, comprising an enclosure, a heat transferring electrically insulating base member, a plurality of pairs of clip members to receive respective pairs of contact blades, a plurality of pairs of receiving contacts each pair being adapted to be connected to a respective main line of a phase and load line, a plurality of electrical connecting means one for each phase connecting respective receiving contacts to said respective clip members, each of said connecting means comprising a portion in direct contact with respective clip members and receiving contacts, the entire base of said clip member being in direct contact with said portion, said clip members and said connecting means being secured to said base member in direct contact thereto, a U-shaped heat conductive member, substantially the entire bridge portion of said U-shaped member being directly in contact with substantially the entire underside of said base, means securing the ends of the legs of said U to said enclosure, the space between said legs defined by the underside of said U-shaped bridge portion, the legs of said U and the enclosure between said legs constituting a cooling duct, manually operable means for shunting said clip members including a shunting bar, overlapping pairs of spaced apart contact elements, one pair for each phase, one contact of said pairs being connected to one of the pairs of clip members, the other contact being connected to the other clip member, said shunting bars being movable between overlapping portions of said spaced apart elements, part of said shunting bar having a conducting element on the bottom, side and top surfaces whereby when said part makes contact with said spaced apart contact elements, a shunt is effected, carrier means coupled to said shunt bars and extending towards opposite sides of said mount and away from the center thereof, and arm means attached to said carrier means and extending along said opposite sides to the bottom of said mount to move said carrier means.

References Cited in the file of this patent

UNITED STATES PATENTS

| | | |
|---|---|---|
| 2,838,626 | Kuhn | June 10, 1958 |
| 2,838,627 | Kuhn et al. | June 10, 1958 |
| 2,949,283 | Smith | Apr. 16, 1960 |
| 3,029,322 | Waldrop | Apr. 10, 1962 |